(12) United States Patent
Weng

(10) Patent No.: US 6,590,847 B2
(45) Date of Patent: Jul. 8, 2003

(54) INTEGRATED LASER DISC CLEANING AND REPAIRING DEVICE

(75) Inventor: Jin-Sheng Weng, Taipei (TW)

(73) Assignee: Taiwan Bor Ying, Taipei Hsien (TW)

( * ) Notice: Subject to any disclaimer, the term of this patent is extended or adjusted under 35 U.S.C. 154(b) by 138 days.

(21) Appl. No.: 09/861,799

(22) Filed: May 21, 2001

(65) Prior Publication Data
US 2002/0172124 A1 Nov. 21, 2002

(51) Int. Cl.[7] .............................. G11B 3/58; G11B 23/50
(52) U.S. Cl. .......................................... 369/72; 15/97.01
(58) Field of Search ............................ 369/72; 15/97.01

(56) References Cited

U.S. PATENT DOCUMENTS

| | | | | |
|---|---|---|---|---|
| 4,654,917 A | * | 4/1987 | Yeung | 15/97.1 |
| 4,709,437 A | * | 12/1987 | Hehn et al. | 15/97.1 |
| 4,713,856 A | * | 12/1987 | Clausen | 15/97.1 |
| 4,750,231 A | * | 6/1988 | Kogashiwa | 15/97.1 |
| 4,783,870 A | * | 11/1988 | Yeung | 15/97.1 |
| 4,825,497 A | * | 5/1989 | Nagao et al. | 15/97.1 |
| 5,102,099 A | * | 4/1992 | Brown et al. | 451/283 |
| 5,584,089 A | * | 12/1996 | Huang | 15/97.1 |
| 6,000,085 A | * | 12/1999 | Weng | 15/102 |
| 6,322,430 B1 | * | 11/2001 | Kennedy et al. | 451/287 |

FOREIGN PATENT DOCUMENTS

WO   WO 97/43763   * 11/1997

* cited by examiner

*Primary Examiner*—William Korzuch
*Assistant Examiner*—Angel Castro
(74) *Attorney, Agent, or Firm*—Pro-Techtor International Services

(57) ABSTRACT

An integrated laser disc cleaning and repairing device includes a case consisting of pivotally connected top and bottom covers, a turning plate rotatably fitted in a hole provided on the top cover, and a base plate eccentrically and rotatably connected to a bottom surface of the turning plate with an operating knob having a lower shaft downward extended through pivot holes on the turning and the base plates. The top cover is provided at an inner surface with a circle of radially inward projected teeth and the base plate at a top surface with a circle of radially outward projected teeth adapted to mesh with the teeth on the top cover. By moving the operating knob to rotate the turning plate, the base plate is caused to revolve around a center of the bottom cover while rotating about the lower shaft portion of the operating knob. Depending on actual need, a cleaning plate and a repairing plate are selectively removably mounted onto a bottom surface of the base plate to move along with the latter, enabling the device to clean or repair a laser disc.

6 Claims, 6 Drawing Sheets

INTEGRATED LASER DISC CLEANING AND REPAIRING DEVICE

BACKGROUND OF THE INVENTION

The present invention relates to an integrated laser disc cleaning and repairing device operative to selectively clean and repair a laser disc depending on actual need.

People pay more and more attention to leisure activities in their daily life, and video and audio equipment plays an important role in some of the leisure activities. Laser discs, including compact discs and video compact discs, quickly become very popular due to their high fidelity. Currently, laser discs could be found in almost every family and entertaining occasions.

A laser disc is a high quality product of technology and requires periodic or non-periodic maintenance and cleaning to protect its quality and usable life, just as any other products.

Any scratch on a laser disc would largely reduce the quality of the laser disc and might even make the laser disc useless. For a minor scratch, it is possible to repair it by abrading the scratch and areas surrounding it.

Since the laser disc has specially structured grooves formed with laser beams, it could be wiped clean or abraded smooth only in a substantially radial direction, that is, from a center of the disc toward an outer periphery thereof or from an outer periphery of the disc toward a center thereof. More specifically, a cleaning or a repairing element must be moved in a direction normal to a circumference of the disc. Any cleaning or repairing done in a direction parallel to the circumferential direction of the laser disc would destruct the grooves on the laser disc to largely adversely affect the quality and the usable life thereof.

Many attempts have been made to develop devices for cleaning and repairing laser discs. However, such devices currently available in the markets all are either a cleaning device or a repairing device to provide only one of the two functions. Consumers have to pay more money to purchase both the cleaning and the repairing devices while two separate devices bring inconvenience in use and occupy increased space for storing them when they are not in use.

SUMMARY OF THE INVENTION

It is therefore a primary object of the present invention to provide an integrated laser disc cleaning and repairing device that could be used to perform two functions, that is, cleaning and repairing, depending on actual need.

To achieve the above and other objects, the integrated laser disc cleaning and repairing device of the present invention mainly includes a case consisting of pivotally connected top and bottom covers, a turning plate rotatably fitted in a hole provided on the top cover, and a base plate eccentrically and rotatably connected to a bottom surface of the turning plate with an operating knob having a lower shaft downward extended through pivot holes on the turning and the base plates. The top cover is provided at an inner surface with a circle of radially inward projected teeth and the base plate at a top surface with a circle of radially outward projected teeth adapted to mesh with the teeth on the top cover. By moving the operating knob to rotate the turning plate, the base plate is caused to revolve around a center of the bottom cover while rotating about the lower shaft of the operating knob. Depending on actual need, a cleaning plate and a repairing plate are selectively removably mounted onto a bottom surface of the base plate through connecting means provided on the base plate and the cleansing and the repairing plates, so that the cleaning or the repairing plate moves along with the base plate to clean or repair a laser disc, respectively.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
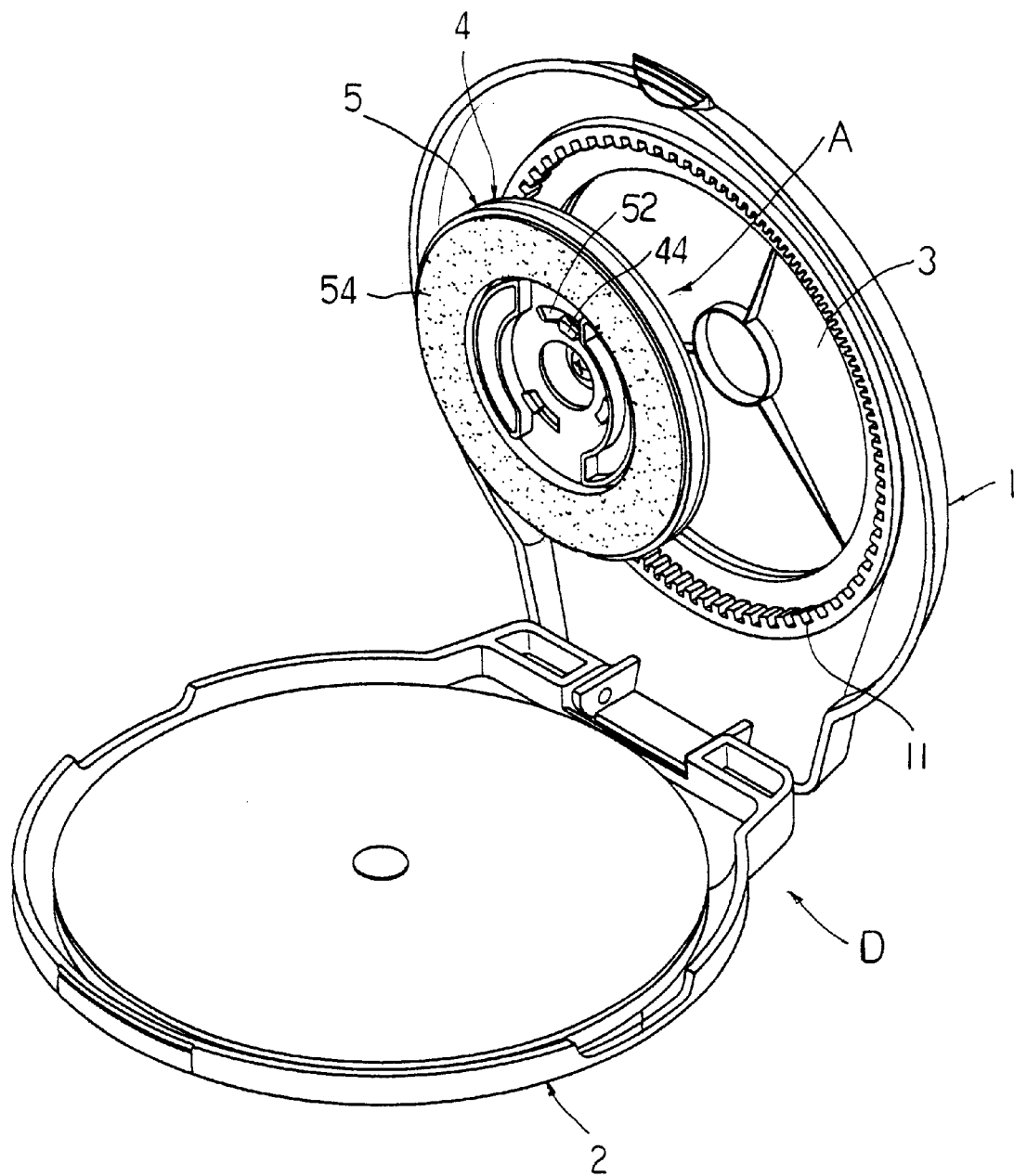
FIG. 1 is a perspective view of an integrated laser disc cleaning and repairing device according to the present invention with a cleansing plate mounted thereto.

Please refer to FIG. 1 that is a perspective view of an integrated laser disc cleaning and repairing device according to the present invention. For clarity purpose, the integrated laser disc cleaning and repairing device will be referred to as "the device" hereinafter. As shown, the device mainly includes a case D consisting of a top cover 1 and a bottom cover 2, a turning plate 3, a base plate 4, a cleaning plate 5, and a repairing plate 6 (not shown in FIG. 1).

Figure 2:
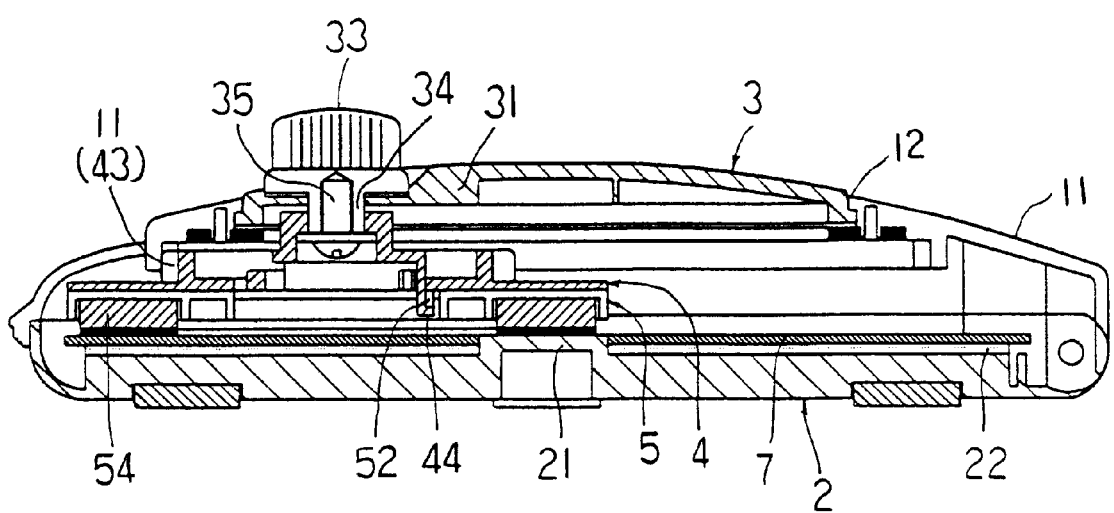
FIG. 2 is a sectioned side view of the integrated laser disc cleaning and repairing device of FIG. 1 with a top cover thereof in a close position.

The top cover 1 is pivotally connected at one side of the bottom cover 2 to pivotally move relative to the bottom cover 2 between a close and an open position. FIG. 1 shows the device with the top cover 1 in the open position, and FIG. 2 is a sectioned side view of the device with the top cover 1 in the close position. The top cover 1 is provided at an inner surface with a circle of continuous and radially inward projected teeth 11. The bottom cover 2 is provided at an inner surface with an upward projected central spindle 21. A mat 22 made of a soft and frictional material is spread over the inner surface of the bottom cover 2 around the spindle 21 for supporting a laser disc 7 (see FIG. 2) thereon.

Figure 3:
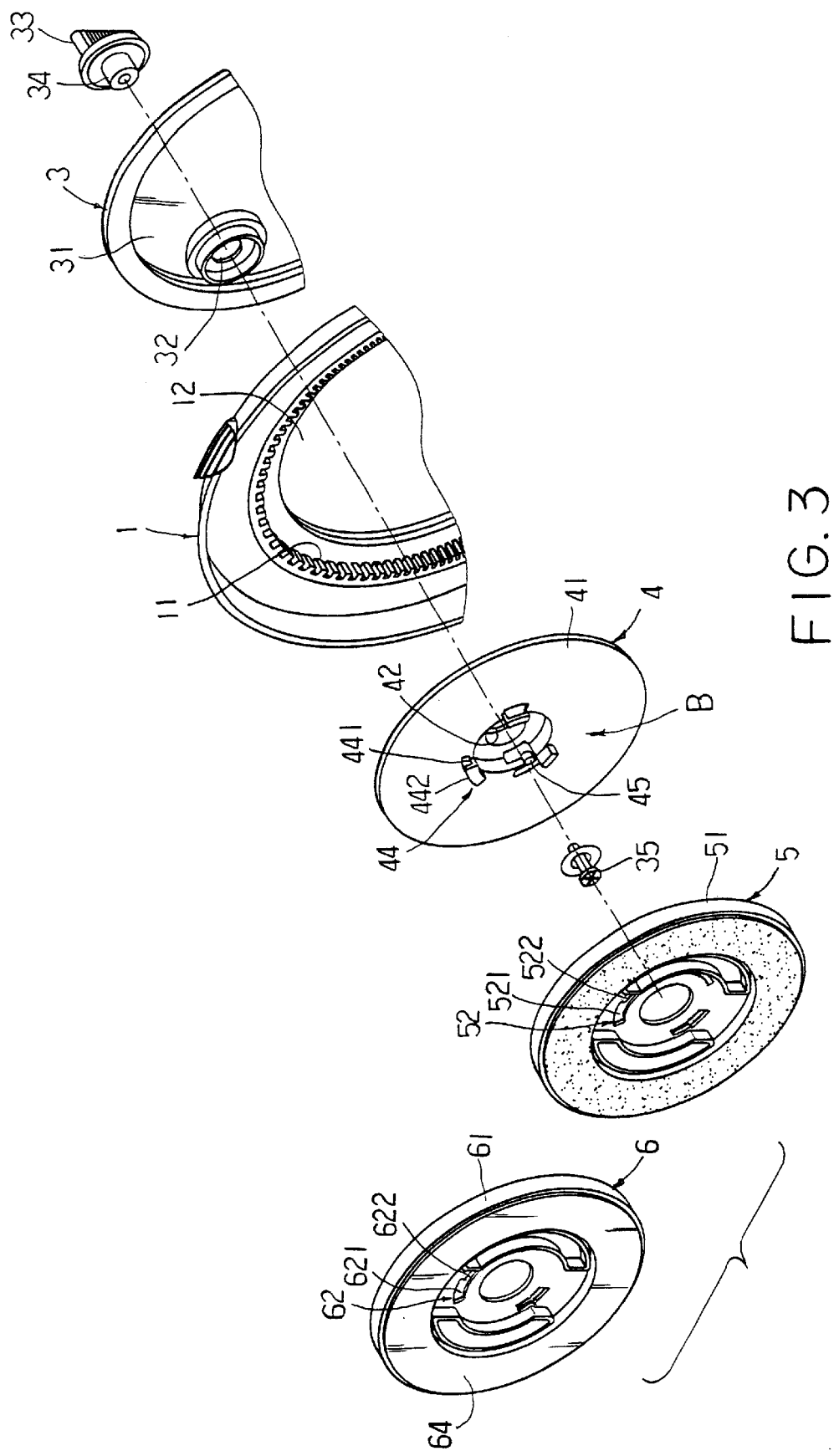
FIG. 3 is an exploded perspective view of a portion of FIG. 1 indicated with letter A.

Please refer to FIG. 3 that is an exploded perspective view of a portion of FIG. 1 indicated with letter A. The turning plate 3 is a round and flat member movably located in a round hole 12 correspondingly provided on the top cover 1, so that the turning plate 3 is freely rotatable within and relative to the top cover 1.

The base plate 4 is pivotally connected to an eccentric point on the turning plate 3. In the illustrate embodiment, the turning plate 3 includes a main body 31 that is provided at a predetermined eccentric point with a pivot hole 32, and the base plate 4 includes a main body 41 that is provided at a center with a pivot hole 42. An operating knob 33 is connected to the turning plate 3 and the base plate 4 by sequentially extending a lower shaft portion 34 of the knob 33 through the eccentric pivot hole 32 and the central pivot hole 42 to receive a fixing pin 35 therein, so that the operating knob 33 is upward projected from the top cover 1 and the base plate 4 is located below the turning plate 3 to be freely turnable about the shaft portion 34 relative to the turning plate 3. The base plate 4 has a diameter slightly larger than a radius of the laser disc 7.

Figure 4:
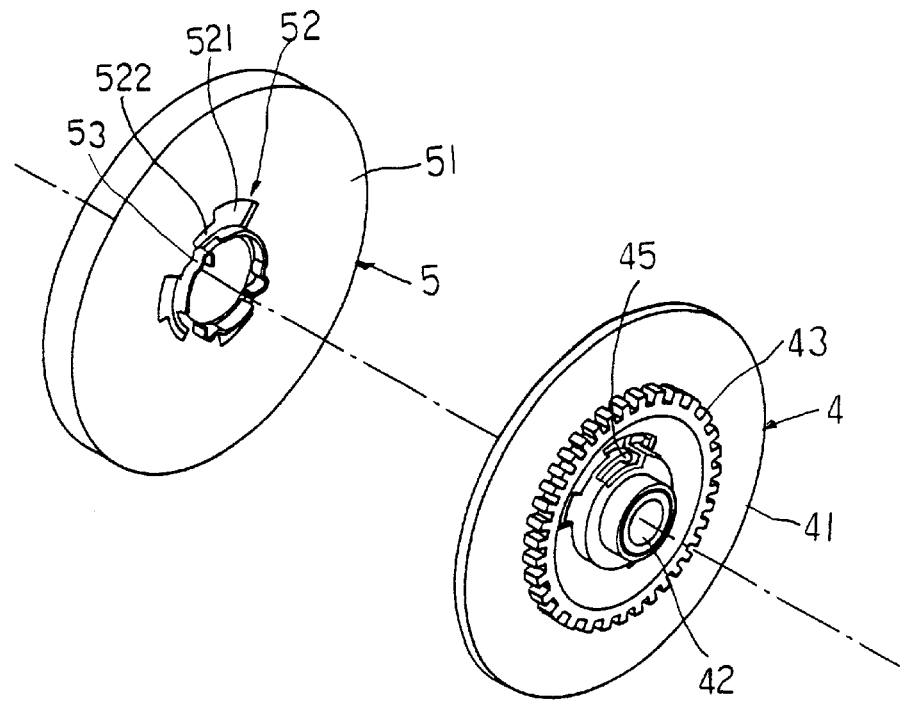
FIG. 4 is an exploded rear perspective view of a base plate and a cleaning plate of the device of FIG. 1.
Figure 5:
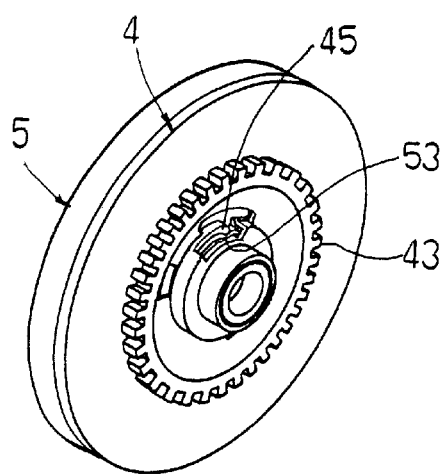
FIG. 5 is an assembled view of FIG. 4.

Please also refer to FIGS. 4 and 5 that are exploded and assembled rear perspective views, respectively, of the base plate 4 and the cleaning plate 5. As shown, the main body 41 of the base plate 4 is provided at a top surface, that is, the surface facing toward the top cover 1, with a circle of continuous and radially outward projected teeth 43. When the base plate 4 is pivotally connected to the turning plate 3 as described above, the outward teeth 43 meshes with some of the inward teeth 11 provided at the inner surface of the top cover 1.

Figure 6:
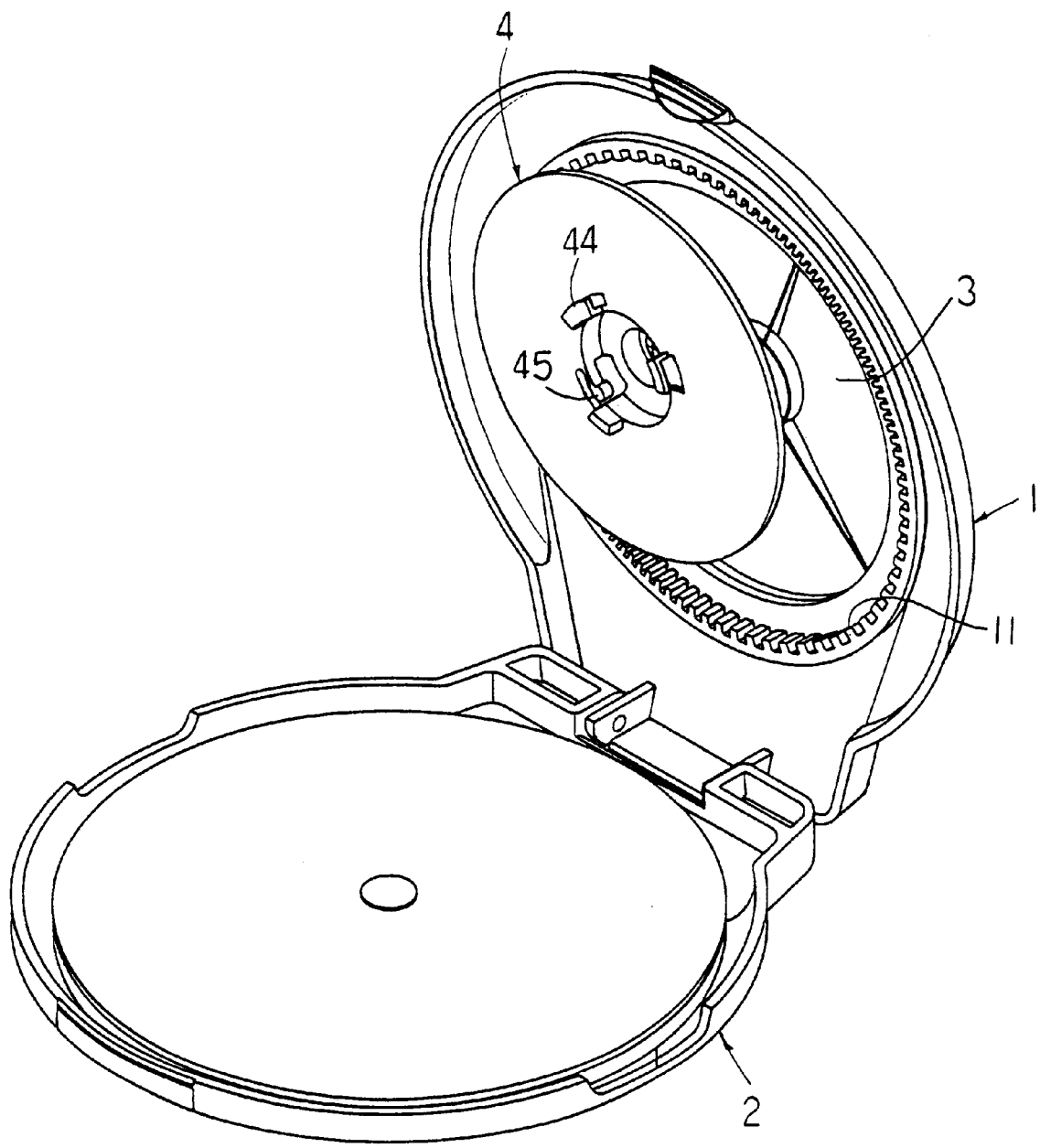
FIG. 6 is a perspective view of the integrated laser disc cleaning and repairing device of the present invention before mounting a cleaning or a repairing plate thereto.

FIG. 6 shows the device of the present invention before mounting the cleaning plate 5 or the repairing plate 6. From FIG. 6, it can be clearly seen how the base plate 4 is pivotally connected to an inner side of the top cover 1 to locate below the turning plate 3. When a force is applied on the operating knob 33 for the same to revolve around the center of the bottom cover 2, the turning plate 3 and the base plate 4 are brought by the operating knob 33 to synchronously revolve at the same time. At this point, the outward teeth 43 of the base plate 4 mesh with the inward teeth 11 of the top cover 1, causing the base plate 4 to rotate with the operating knob 33 as a central axis thereof. Thus, a rotating track and a revolving track are created for the base plate 4. From FIG. 6, it can also be clearly seen that the cleaning plate 5 and the repairing plate 6 may be selectively mounted onto or removed from the base plate 4.

Please refer back to FIGS. 3 to 5 in which a connecting structure B provided on the base plate 4 and the cleaning plate 5 is shown. The connecting structure B allows the cleaning plate 5 to be easily removably mounted to a bottom surface of the base plate 4, that is, the surface of the base plate 4 facing away from the top cover 1. In an embodiment illustrated in the drawings, the connecting structure B includes a plurality of hooks 44 provided on the bottom surface of the main body 41 of the base plate 4 to space from one another in a circumferential direction. Each hook 44 includes an axially projected neck portion 441 and a hook portion 442 radially projected from an end of the neck portion 441. The connecting structure B also includes a plurality of engaging holes 52 provided on a main body 51 of the cleaning plate 5 corresponding to the a plurality of hooks 44 on the base plate 4. Each engaging hole 52 includes a widened portion 521 for the hook portion 442 of the hook 44 to pass therethrough and a narrowed portion 522 for only the neck portion 441 of the hook 44 to stay therein. The cleaning plate 5 is mounted onto the base plate 4 by aligning the widened portions 521 of the engaging holes 52 with the hooks 44 for the latter to insert into the engaging holes 52, and then turning the cleaning plate 5 for the neck portions 441 of the hooks 44 to enter and stay in the narrowed portions 522 of the engaging holes 52 with the hook portions 442 hooking and pressing against a bottom surface of the cleaning plate 5 facing toward the laser disc 7. To remove the cleaning plate 5 from the base plate 4, simply turn the cleaning plate 5 in reverse direction, so that the hook portions 442 of the base plate 4 are moved into the widened portions 521 of the engaging holes 52 again.

As can be seen in FIG. 4, the base plate 4 is also provided at its main body 41 with at least one retaining projection 45, and the cleaning plate 5 is provided at a top surface near the engaging holes 52 with a plurality of retaining recesses 53. When the cleaning plate 5 has been mounted onto the base plate 4 in the above-described manner, the at least one retaining projection 45 engages into one of the retaining recesses 53 to keep the cleaning plate 5 firmly connected to the base plate 4.

The cleaning plate 5 is provided around an outer peripheral area of its bottom surface with a cleaning element 54, such as a layer of deerskin attached to the bottom surface of the cleaning plate 5.

As shown in FIG. 1, when the cleaning plate 5 is mounted onto the base plate 4 in the above-described manner, the device functions like a laser disc cleaning device. By moving the operating knob 32, the cleaning plate 5 is caused to revolve around the spindle 21 of the bottom cover 2 while rotating about the lower shaft portion 34 of the operating knob 33. This simultaneous revolving and rotating movement of the cleaning plate 5 enables the cleaning element 54 attached to the bottom surface of the cleaning plate 5 to wipe in radial direction every area on the surface of the laser disc 7 disposed on the bottom cover 2 to effectively clean the laser disc 7.

Figure 7:
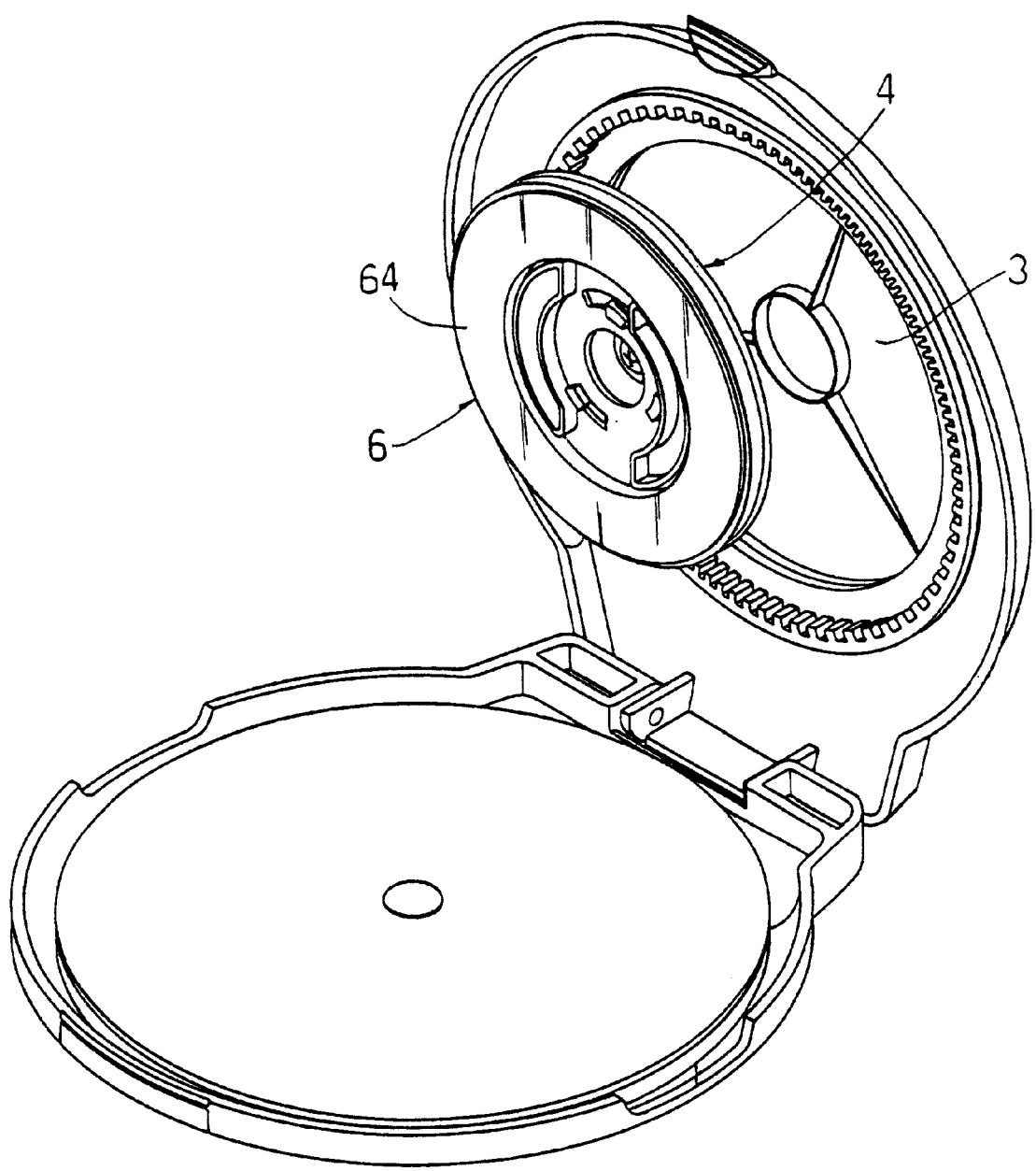
FIG. 7 is a perspective view of the integrated laser disc cleaning and repairing device of the present invention with a repairing plate mounted thereto.

FIG. 7 shows the device of the present invention has a repairing plate 6 mounted onto the base plate 4 to function like a laser disc repairing device. Please refer to FIGS. 3 and 7 at the same time. The cleaning plate 5 may be removed from the base plate 4 in the above-described manner and then the repairing plate 6 is mounted onto the base plate 4. The repairing plate 6 is generally structurally the same as the cleaning plate 5. That is, the repairing plate 6 includes a main body 61 on which a plurality of engaging holes 62 consisting of a widened portion 621 and a narrowed portion 622, and retaining recesses (not shown) are provided. A repairing element 64, such as a layer of very fine abrasive, is attached to a bottom surface of the main body 61 around an outer peripheral area thereof. By moving the operating knob 32, the repairing plate 6 is caused to revolve around the spindle 21 while rotating about the lower shaft portion 34. This simultaneous revolving and rotating movement of the repairing plate 6 enables the repairing element 64 attached to the bottom surface of the repairing plate 6 to abrade and smoothen in radial direction every area on the surface of the laser disc 7 disposed on the bottom cover 2 to gradually smooth out scratch on the surface of the laser disc 7 and thereby effectively repair the same.

What is claimed is:

1. An integrated laser disc cleaning and repairing device, comprising:

a case comprising a top cover and a bottom cover that are pivotally connected to each other at one side thereof, so that said top cover is pivotally openable and closable relative to said bottom cover, said top cover being provided on an inner surface with a circle of continuous and radially inward projected teeth, and said bottom cover having an inner surface form laser disc to disposed thereon;

a turning plate being rotatably fitted in a round hole correspondingly provided on said top cover of said case, and said turning plate being provided at an eccentric point with a pivot hole;

a base plate including a main body rotatably connected to said eccentric pivot hole on said turning plate, said main body being provided on a top surface, that is, a surface thereof facing toward said top cover, with a circle of continuous and radially outward projected teeth adapted to mesh with a part of said radially inward projected teeth on the inner surface of said top cover, and said main body being provided at a bottom surface, that is, a surface thereof facing away from said top cover, with connecting means;

a cleaning plate including a main body, on a top surface thereof connecting means corresponding to said connecting means on said base plate being provided for said cleaning plate to removably mount onto the bottom surface of said base plate, enabling said device to serve as a laser disc cleaning device; and said cleaning plate having a cleaning element attached to an outer peripheral area of a bottom surface thereof; and a repairing plate including a main body, on a top surface thereof connecting means corresponding to said connecting means on said base plate being provided for said repairing plate to removably mount onto the bottom surface of said base plate, enabling said device to serve as a laser disc repairing device; and said repairing plate having a repairing element attached to an outer peripheral area of a bottom surface thereof; wherein said connecting means on said base plate comprises a plurality of hooks provided on the bottom surface of said main body of said base plate to space from one another in a circumferential direction, each hook including an axially projected neck portion and a hook portion radially projected from an end of the neck portion, and said connecting means on said cleaning plate comprising a plurality of engaging holes provided on said main body of said cleaning plate corresponding to said a plurality of hooks on said base plate, and each engaging hole including a widened portion for said hook portion of said hook to pass therethrough and a narrowed portion for only said neck portion of said hook to stay therein; whereby, by aligning said widened portions of said engaging holes with said hooks for the latter to insert into said engaging holes, and then turning said cleaning plate for said neck portions of said hooks to enter and stay in said narrowed portions of said engaging holes with said hook portions hooking and pressing against the bottom surface of said cleaning plate, said cleaning plate is mounted onto the bottom surface of said base plate.

2. The integrated laser disc cleaning and repairing device as claimed in claim 1, wherein:

said base plate is provided on said main body with at least one retaining projection and said cleaning plate is provided at said top surface near said engaging holes with a plurality of retaining recesses, such that when said cleaning plate is mounted onto said base plate, said retaining projection engages with one of said a plurality of retaining recesses to firmly attach said cleaning plate to said base plate.

3. The integrated laser disc cleaning and repairing device as claimed in claim 1, wherein:

said base plate is provided on said main body with a central pivot hole, and said base plate being rotatably connected to said turning plate by sequentially extending a lower shaft portion of an operating knob downward through said eccentric pivot hole and said central pivot hole to receive a fixing pin therein, so that said operating knob projects upward from said top cover and said base plate is located below said turning plate to be freely turnable about said shaft portion relative to said turning plate.

4. An integrated laser disc cleaning and repairing device, comprising:

a case comprising a top cover and a bottom cover that are pivotally connected to each other at one side thereof, so that said top cover is pivotally openable and closable relative to said bottom cover, said top cover being provided on an inner surface with a circle of continuous and radially inward projected teeth, and said bottom cover having an inner surface for a laser disc to disposed thereon;

a turning plate being rotatably fitted in a round hole correspondingly provided on said top cover of said case, and said turning plate being provided at an eccentric point with a pivot hole;

a base plate including a main body rotatably connected to said eccentric pivot hole on said turning plate, said main body being provided on a top surface, that is, a surface thereof facing toward said top cover, with a circle of continuous and radially outward projected teeth adapted to mesh with a part of said radially inward projected teeth on the inner surface of said top cover, and said main body being provided at a bottom surface, that is, a surface thereof facing away from said top cover, with connecting means;

a cleaning plate including a main body, on a top surface thereof connecting means corresponding to said connecting means on said base plate being provided for said cleaning plate to removably mount onto the bottom surface of said base plate, enabling said device to serve as a laser disc cleaning device; and said cleaning plate having a cleaning element attached to an outer peripheral area of a bottom surface thereof; and a repairing plate including a main body, on a top surface thereof connecting means corresponding to said connecting means on said base plate being provided for said repairing plate to removably mount onto the bottom surface of said base plate, enabling said device to serve as a laser disc repairing device; and said repairing plate having a repairing element attached to an outer peripheral area of a bottom surface thereof; wherein said connecting means on said base plate comprises a plurality of hooks provided on the bottom surface of said main body of said base plate to space from one another in a circumferential direction, each hook including an axially projected neck portion and a hook portion radially projected from an end of the neck portion, and said connecting means on said repairing plate comprising a plurality of engaging holes provided on said main body of said repairing plate corresponding to said a plurality of hooks on said base plate, and each engaging hole including a widened portion for said hook portion of said hook to pass therethrough and a narrowed portion for only said neck portion of said hook to stay therein; whereby, by aligning said widened portions of said engaging holes with said hooks for the latter to insert into said engaging holes, and then turning said repairing plate for said neck portions of said hooks to enter and stay in said narrowed portions of said engaging holes with said hook portions hooking and pressing against the bottom surface of said repairing plate, said repairing plate is mounted onto the bottom surface of said base plate.

5. The integrated laser disc cleaning and repairing device as claimed in claim 3, wherein:

said base plate is provided on said main body with at least one retaining projection and said repairing plate is provided at said top surface near said engaging holes with a plurality of retaining recesses, such that when said repairing plate is mounted onto said base plate, said retaining projection engages with one of said a plurality of retaining recesses to firmly attach said repairing plate to said base plate.

6. The integrated laser disc cleaning and repairing device as claimed in claim 4, wherein:

said base plate is provided on said main body with a central pivot hole, and said base plate being rotatably connected to said turning plate by sequentially extending a lower shaft portion of an operating knob downward through said eccentric pivot hole and said central pivot hole to receive a fixing pin therein, so that said operating knob projects upward from said top cover and said base plate is located below said turning plate to be freely turnable about said shaft portion relative to said turning plate.

* * * * *

UNITED STATES PATENT AND TRADEMARK OFFICE
CERTIFICATE OF CORRECTION

PATENT NO.   : 6,590,847 B2
DATED        : July 8, 2003
INVENTOR(S)  : Jin-Sheng Weng It is certified that error appears in the above-identified patent and that said Letters Patent is hereby corrected as shown below:

<u>Title page,</u>
Item [73], Assignee, insert -- Corporation -- following "Taiwan Bor Ying".

Signed and Sealed this

Third Day of January, 2006

JON W. DUDAS
*Director of the United States Patent and Trademark Office*